(12) United States Patent
Sadakane et al.

(10) Patent No.: US 11,731,900 B2
(45) Date of Patent: Aug. 22, 2023

(54) GLASS AND LAMINATED GLASS

(71) Applicant: AGC Inc., Tokyo (JP)

(72) Inventors: Shunsuke Sadakane, Tokyo (JP);
Ryota Nakamura, Tokyo (JP); Akira Hirano, Tokyo (JP)

(73) Assignee: AGC Inc., Tokyo (JP)

( * ) Notice: Subject to any disclaimer, the term of this patent is extended or adjusted under 35 U.S.C. 154(b) by 365 days.

(21) Appl. No.: 17/167,212

(22) Filed: Feb. 4, 2021

(65) Prior Publication Data
US 2021/0155536 A1 May 27, 2021

Related U.S. Application Data

(63) Continuation of application No. PCT/JP2019/023938, filed on Jun. 17, 2019.

(30) Foreign Application Priority Data

Aug. 9, 2018 (JP) .................................. 2018-150612

(51) Int. Cl.
*B32B 15/04* (2006.01)
*B32B 17/06* (2006.01)
(Continued)

(52) U.S. Cl.
CPC .... *C03C 17/3644* (2013.01); *B32B 17/10165* (2013.01); *B32B 17/10192* (2013.01); *B32B 17/10431* (2013.01); *B60J 1/002* (2013.01); *B60J 1/08* (2013.01); *C03C 17/06* (2013.01); *C03C 17/32* (2013.01); *C03C 17/38* (2013.01); *C03C 2217/78* (2013.01)

(58) Field of Classification Search
CPC ..................... B32B 17/10431; B32B 17/10165
USPC .................................................. 428/426, 432
See application file for complete search history.

(56) References Cited

U.S. PATENT DOCUMENTS

| 11,097,516 B2* | 8/2021 | Sadakane | ............. B32B 27/304 |
| 11,312,110 B2* | 4/2022 | Wohlfeil | ............ B32B 17/10146 |

(Continued)

FOREIGN PATENT DOCUMENTS

| JP | 2006-327381 A | 12/2006 |
| JP | 2015-24930 A | 2/2015 |

(Continued)

*Primary Examiner* — Lauren R Colgan
(74) *Attorney, Agent, or Firm* — Oblon, McClelland, Maier & Neustadt, L.L.P.

(57) ABSTRACT

Glass for a vehicle includes a glass plate; a test-region A demarcated in the glass plate, the test-region A being specified in JIS R3212; a shielding layer provided more outwardly than the test-region A in a plan view; an information transmission/reception region demarcated within an opening portion provided in the shielding layer, and through which a device mounted in the vehicle transmits/receives information; and an infrared reflective layer positioned peripheral to the information transmission/reception region in a plan view, the infrared reflective layer having a portion that overlaps with the shielding layer in a plan view, wherein a solar direct transmittance of the test-region A is 60% or less and a solar direct reflectance of a region in which the infrared reflective layer is provided peripheral to the information transmission/reception region is greater than a solar direct reflectance of the test-region A by at least 5%.

15 Claims, 9 Drawing Sheets

(51) Int. Cl.
    *C03C 17/36*     (2006.01)
    *B60J 1/00*     (2006.01)
    *B60J 1/08*     (2006.01)
    *C03C 17/32*     (2006.01)
    *C03C 17/38*     (2006.01)
    *B32B 17/10*     (2006.01)
    *C03C 17/06*     (2006.01)

(56) References Cited

U.S. PATENT DOCUMENTS

| | | | |
|---|---|---|---|
| 2019/0030865 A1* | 1/2019 | Aoki | B32B 3/02 |
| 2019/0315202 A1* | 10/2019 | Oya | B60J 1/02 |
| 2019/0337270 A1* | 11/2019 | Sadakane | G02B 27/0101 |
| 2021/0059022 A1* | 2/2021 | Sadakane | B32B 17/10165 |

FOREIGN PATENT DOCUMENTS

| | | |
|---|---|---|
| JP | 6065221 B2 | 1/2017 |
| JP | 2017-114484 A | 6/2017 |
| JP | 2017-165608 A | 9/2017 |
| JP | 2018-162050 A | 10/2018 |
| WO | WO 2016/129699 A1 | 8/2016 |
| WO | WO 2017/159452 A1 | 9/2017 |

\* cited by examiner

|  |  | Example 1 | | Example 2 | | Example 3 | |
| --- | --- | --- | --- | --- | --- | --- | --- |
|  |  | 1A | 1B | 2A | 2B | 3A | 3B |
| Infrared reflective layer present in test region A? | | Yes | Yes | Yes | Yes | Yes | Yes |
| Peripheral region of information transmission and reception region | Solar direct reflectance Re [%] | 61.0 | 61.0 | 67.5 | 67.5 | 75.0 | 75.0 |
| | Solar direct transmittance Te [%] | 0 | 0 | 0 | 0 | 0 | 0 |
| | Solar direct absorptance α [%] | 39.0 | 39.0 | 32.5 | 32.5 | 25.0 | 25.0 |
| | Vehicle-interior surface normal emissivity [%] | 0.89 | 0.95 | 0.89 | 0.95 | 0.89 | 0.95 |
| | Vehicle-interior surface heat-inflow amount [W/m²] | 110.3 | 113.3 | 91.9 | 94.4 | 70.7 | 72.6 |
| | Thermal evaluation | Good | Good | Good | Good | Good | Good |
| Test region A | Solar direct reflectance Re [%] | 50.7 | 50.7 | 50.7 | 50.7 | 50.7 | 50.7 |
| | Visible light transmittance Tv [%] | 70.8, Good | 70.8, Good | 70.8, Good | 70.8, Good | 70.8, Good | 70.8, Good |
| | Electromagnetic wave transmittance | Fair | Fair | Fair | Fair | Fair | Fair |
| | Scorching sensation felt by occupants | 28.8, Very Good | 28.8, Very Good | 28.8, Very Good | 28.8, Very Good | 28.8, Very Good | 28.8, Very Good |
| Comprehensive evaluation | | Good | Good | Good | Good | Good | Good |

FIG.8

|  |  | Comparative Example 1 | | Comparative Example 2 | | Comparative Example 3 | |
|---|---|---|---|---|---|---|---|
|  |  | 1A | 1B | 2A | 2B | 3A | 3B |
| Infrared reflective layer present in test region A? | | Yes | Yes | Yes | Yes | Yes | Yes |
| Peripheral region of information transmission and reception region | Solar direct reflectance Re [%] | 61.0 | 61.0 | 50.7 | 50.7 | 40.4 | 40.4 |
| | Solar direct transmittance Te [%] | 0 | 0 | 0 | 0 | 0 | 0 |
| | Solar direct absorptance α [%] | 39.0 | 39.0 | 49.3 | 49.3 | 59.6 | 59.6 |
| | Vehicle-interior surface normal emissivity [%] | 0.89 | 0.95 | 0.95 | 0.89 | 0.95 | 0.89 |
| | Vehicle-interior surface heat-inflow amount [W/m²] | 110.3 | 113.3 | 171.9 | 139.5 | 207.5 | 168.4 |
| | Thermal evaluation | Good | Good | Fair | Fair | Fair | Fair |
| Test region A | Solar direct reflectance Re [%] | 61.0 | 61.0 | 50.7 | 50.7 | 40.4 | 40.4 |
| | Visible light transmittance Tv [%] | 56.0, Bad | 56.0, Bad | 70.8, Good | 70.8, Good | 78.6, Good | 78.6, Good |
| | Electromagnetic wave transmittance | Fair | Fair | Fair | Fair | Fair | Fair |
| | Scorching sensation felt by occupants | 21.7, Very Good | 21.7, Very Good | 28.8, Very Good | 28.8, Very Good | 42.6, Very Good | 42.6, Very Good |
| Comprehensive evaluation | | Bad | Bad | Fair | Fair | Fair | Fair |

FIG.9

|  |  | Example 4 | | Example 5 | | Comparative Example 4 | |
| --- | --- | --- | --- | --- | --- | --- | --- |
|  |  | 4A | 4B | 5A | 5B | 4A | 4B |
| Infrared reflective layer present in test region A? | | No | No | No | No | No | No |
| Peripheral region of information transmission and reception region | Solar direct reflectance Re [%] | 24.5 | 24.5 | 10.7 | 10.7 | 5.7 | 5.7 |
| | Solar direct transmittance Te [%] | 0 | 0 | 0 | 0 | 0 | 0 |
| | Solar direct absorptance α [%] | 75.5 | 75.5 | 89.3 | 89.3 | 94.3 | 94.3 |
| | Vehicle-interior surface normal emissivity [%] | 0.89 | 0.95 | 0.95 | 0.89 | 0.95 | 0.89 |
| | Vehicle-interior surface heat-inflow amount [W/m²] | 219.1 | 213.4 | 259.3 | 252.5 | 328.8 | 266.8 |
| | Thermal evaluation | Fair | Fair | Fair | Fair | Bad | Bad |
| Test region A | Solar direct reflectance Re [%] | 5.7 | 5.7 | 5.7 | 5.7 | 5.7 | 5.7 |
| | Visible light transmittance Tv [%] | 79.1, Good | 79.1, Good | 79.1, Good | 79.1, Good | 79.1, Good | 79.1, Good |
| | Electromagnetic wave transmittance | Good | Good | Good | Good | Good | Good |
| | Scorching sensation felt by occupants | 53.4, Good | 53.4, Good | 53.4, Good | 53.4, Good | 53.4, Good | 53.4, Good |
| Comprehensive evaluation | | Good | Good | Good | Good | Bad | Bad |

FIG.10

GLASS AND LAMINATED GLASS

CROSS-REFERENCE TO RELATED APPLICATIONS

This application is a continuation of International Application PCT/JP2019/023938, filed on Jun. 17, 2019 and designated the U.S., which is based on and claims priority to Japanese Patent Application No. 2018-150612 filed on Aug. 9, 2018, with the Japan Patent Office. The entire contents of these applications are incorporated herein by reference.

BACKGROUND OF THE INVENTION

1. Field of the Invention

The present disclosure relates to glass and laminated glass.

2. Description of the Related Art

In recent years, vehicles with the ability to automatically avoid collisions with vehicles travelling ahead and pedestrians are being developed. For example, for such a vehicle, a device such as a camera is mounted in the vehicle, to transmit and receive information such as road conditions via vehicle glass (e.g. windshield or the like) (see Patent Document 1, for example).

Although a device such as a camera is affixed to glass of the vehicle via a bracket, there are cases where a where a shielding layer (for example, a black ceramic) is formed on the glass of the vehicle in order to prevent ultraviolet ray-induced degradation of an adhesive that is used for the affixing of the bracket.

However, when a shielding layer is formed on glass of a vehicle, the temperature of the glass of the vehicle increases due to absorption of solar heat by the shielding layer. There are also cases where radiant heat arising from an increase in temperature of the glass of the vehicle in turn increases the temperature of the device to the extent that the sensing performance of the device is hindered.

However, in addition to the problem of the temperature rise in the device, it is also necessary to suppress a temperature rise, within the vehicle cabin, resulting from heat inflow of solar heat from the glass. Furthermore, it is also necessary to be safety-compliant as vehicle glass in terms of electromagnetic wave transmittance, for example.

There may be a need to provide glass that makes the sensing performance of devices unlikely to be hindered by heat, keeps the temperature from increasing in the vehicle cabin, and is safe as glass for vehicles.

CITATION LIST

Patent Literature

[PTL 1] International Publication No. 2016-129699

SUMMARY OF THE INVENTION

Glass of the present disclosure is glass for a vehicle and includes a glass plate; a test region A demarcated in the glass plate, the test region A being specified in Japanese Industrial Standard JIS R3212; a shielding layer provided more outwardly than the test region A in a plan view; an information transmission and reception region demarcated within an opening portion provided in the shielding layer, and through which a device mounted in the vehicle transmits and/or receives information; and an infrared reflective layer positioned peripheral to the information transmission and reception region in a plan view, the infrared reflective layer having a portion that overlaps with the shielding layer in a plan view, wherein a solar direct transmittance of the test region A is 60% or less and a solar direct reflectance of a region in which the infrared reflective layer is provided peripheral to the information transmission and reception region is greater than a solar direct reflectance of the test region A by at least 5%.

Effect of Invention

According to at least one embodiment of the present disclosure, glass that makes the sensing performance of devices unlikely to be hindered by heat, keeps the temperature from increasing in the vehicle cabin, and is safe as glass for vehicles, can be provided.

BRIEF DESCRIPTION OF THE DRAWINGS

FIG. 8 is a diagram for describing about examples and comparative examples (first of three);

FIG. 9 is a diagram for describing about examples and comparative examples (second of three); and FIG. 10 is a diagram for describing about examples and comparative examples (third of three).

DESCRIPTION OF THE PREFERRED EMBODIMENTS

Figure 1A:
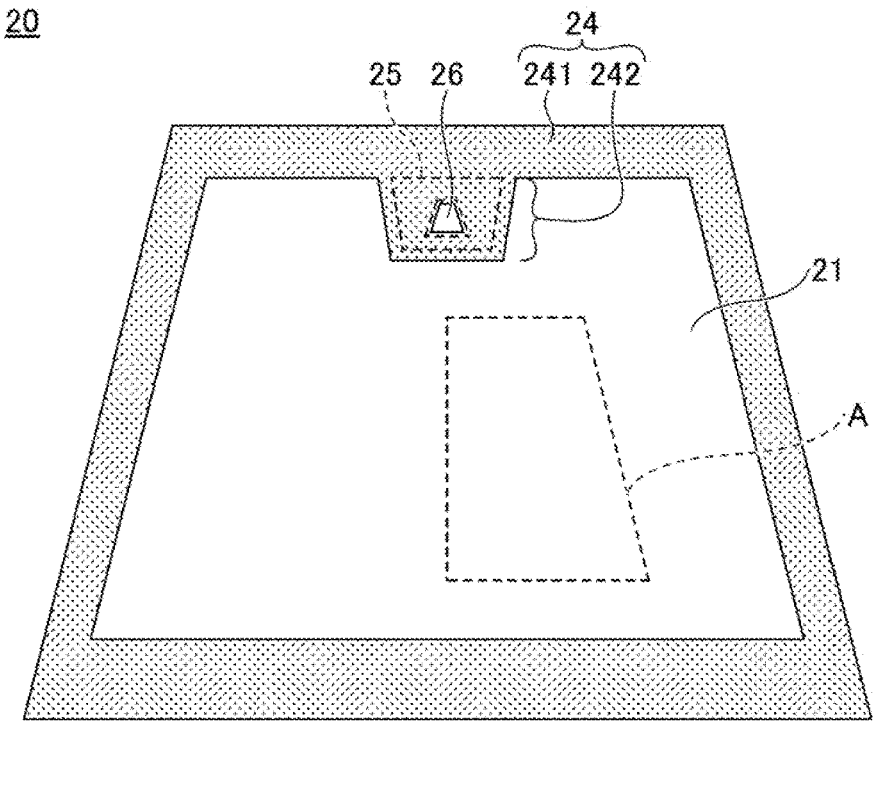
FIGS. 1A and 1B are diagrams illustrating a windshield for a vehicle according to a First Embodiment.

Hereinafter, an embodiment for carrying out the invention is described with reference to the drawings. In each drawing, the same components are indicated by the same reference numerals and overlapping descriptions may be omitted. In each drawing, the size and shape may be partially exaggerated to facilitate understanding of the subject matter of the invention.

Here, although a windshield for a vehicle is used as an example, this is not limiting. Also, although an automobile is a typical example of a vehicle, the term "vehicle" refers to a movable body having glass, examples of which include trains, boats, and aerial vehicles.

Also, a plan view refers to observing a predetermined region of a windshield in a direction of a line normal to the predetermined region. Also, a plan-view shape refers to a shape of the predetermined region of the front glass observed in the direction of the line normal to the predetermined region. In the present specification, up-down refers to the Z-axis direction in the drawings, whereas left-right refers to the Y-axis direction in the drawings.

Solar direct transmittance in the present disclosure is a value specified in Japanese Industrial Standard JIS R3106: 1998 and is also referred to below as Te.

Solar direct reflectance in the present disclosure is a value specified in Japanese Industrial Standard JIS R3106:1998, and is also referred to below as Re.

Visible light reflectance in the present disclosure is a value specified in Japanese Industrial Standard JIS R3106: 1998.

Visible light transmittance in the present disclosure is a value specified in the Japanese Industrial Standard JIS R3106:1998 and is also referred to below as Tv.

First Embodiment

Figure 1B:
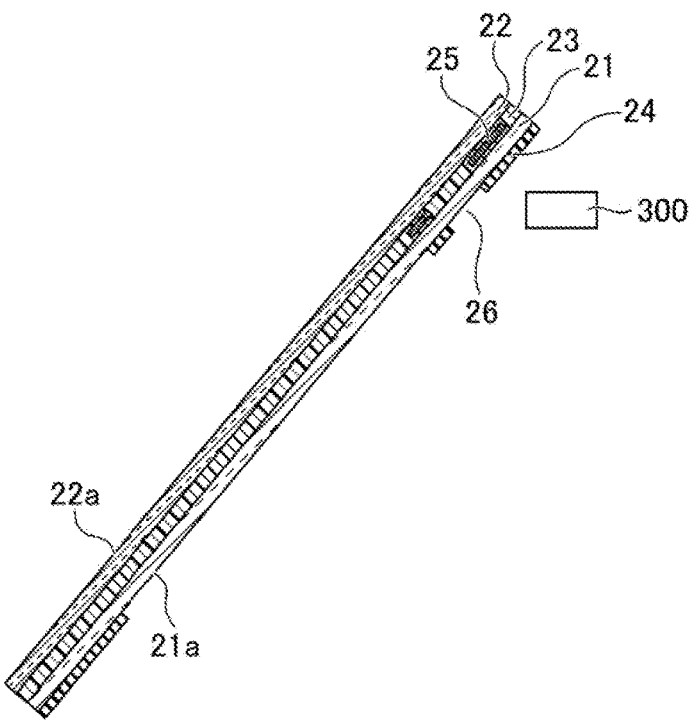

FIG. 1A and FIG. 1B are diagrams illustrating a windshield for a vehicle according to the First Embodiment. FIG. 1A is a diagram schematically illustrating an aspect of the windshield as observed from the interior of the vehicle toward the exterior of the vehicle (a state in which a windshield 20 attached to the vehicle with the Z-direction is upward). FIG. 1B is a cross-sectional view of the windshield 20 illustrated in FIG. 1A as observed in the Y-direction with the windshield 20 cut in the XZ-direction. In FIG. 1B, although the windshield 20 and a device 300 are illustrated together for the sake of convenience, the device 300 is not a component of the windshield 20.

Figure 2A:
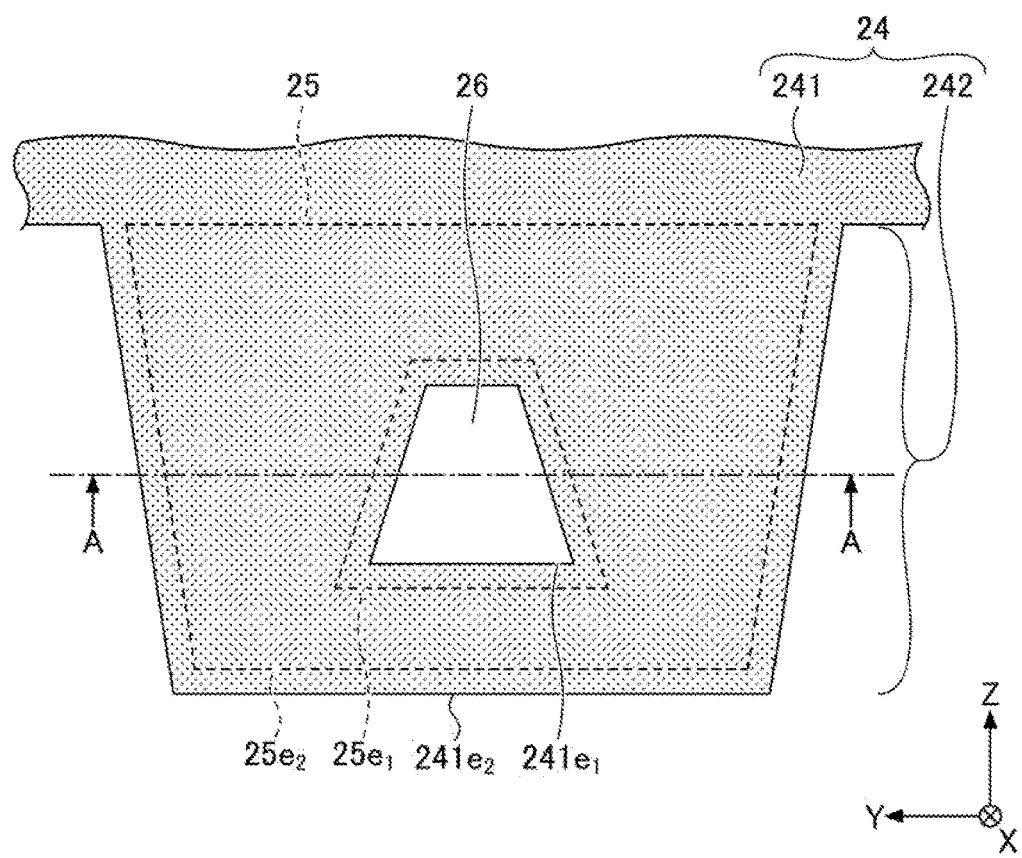
FIGS. 2A and 2B are diagrams illustrating the vicinity of an information transmission and reception region according to the First Embodiment.
Figure 2B:
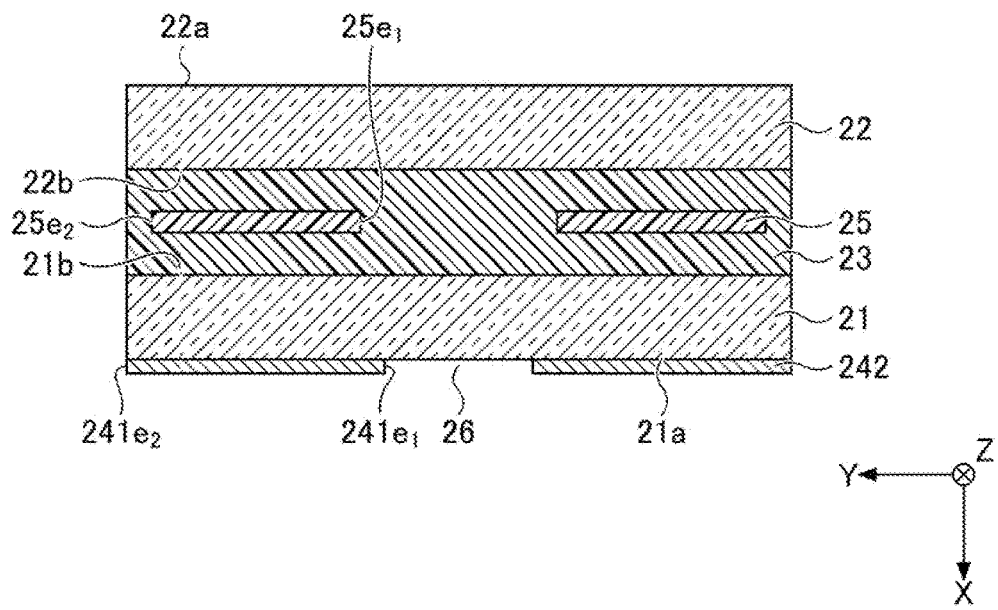

FIG. 2A and FIG. 2B are diagrams illustrating the vicinity of an information transmission and reception region according to the First Embodiment. FIG. 2A is a partially enlarged plan view schematically illustrating an aspect of the information transmission and reception region as observed from the interior of the vehicle toward the exterior of the vehicle, whereas FIG. 2B is a partially enlarged cross-sectional view taken along A-A line of FIG. 2A.

As illustrated in FIGS. 1A and 2A and FIGS. 2A and 2B, the windshield 20 is laminated glass for a vehicle and includes a glass plate 21, a glass plate 22, an intermediate film 23, a shielding layer 24, and an infrared reflective layer 25.

The glass plate 21 is a vehicle-interior-side glass plate situated on the vehicle-interior side upon attaching of the windshield 20 to the vehicle. Also, the glass plate 22 is a vehicle-exterior-side glass plate situated on the vehicle-exterior side upon attaching of the windshield 20 to the vehicle. The glass plate 21 and the glass plate 22 are bonded together with an intermediate film 23 and an infrared reflective layer 25 therebetween. The intermediate film 23 may have multiple intermediate layers. The glass plate 21, the glass plate 22, and the intermediate film 23 are described in detail further below.

The shielding layer 24 has a peripheral region 241 that is provided on the peripheral portion of a vehicle-interior-side surface 21a of the glass plate 21 and has a protruding portion 242 that protrudes from the peripheral region 241 toward a test region A as viewed in a plan view. The test region A is described further below. The shielding layer 24 is an opaque layer and can be formed by, for example, applying printing ink in a predetermined color to the glass surface and baking the applied printing ink to the glass surface. The shielding layer 24 is, for example, an opaque colored (black, for example) ceramic layer. With the opaque shielding layer 24 on the windshield 20, ultraviolet ray-induced degradation of resins such as urethane and the like that keep the peripheral portion of the windshield 20 fixed to the vehicle body, an adhesive member for affixing the bracket that fixedly holds the device 300 to the windshield 20, and the like can be suppressed. The shielding layer 24 may be a colored intermediate film or a colored film having opacity, or may be a combination the colored intermediate film and a colored ceramic layer. The colored film may be integrated with the infrared reflective film which is described further below.

The test region A specified in Japanese Industrial Standard JIS R3212 is demarcated in the windshield 20. Also, the information transmission and reception region 26 is demarcated in the windshield 20. The test region A is located within the region surrounded by the shielding layer 24 in a plan view, whereas the information transmission and reception region 26 is demarcated within the opening portion provided in the protruding portion 242 of the shielding layer 24.

The information transmission and reception region 26 functions as a region through which the device 300 transmits and/or receives information in a case where the device 300 is arranged at, for example, the top-side peripheral portion of the windshield 20 inside the vehicle. Although there are no particular limitations with respect to the plan-view shape of the information transmission and reception region 26, the plan-view shape is an isosceles trapezoid, for example. The information transmission and reception region 26, when attached to the windshield 20, is preferably located higher up than the test region A to ensure that the field of view of the driver is not hampered, and because this location is advantageous for transmitting and/or receiving information.

The device 300 is a device that transmits and/or receives information, examples of which include cameras that acquire visible light, infrared light, and the like, millimeter-wave radar, infrared laser, and the like. Besides the device 300, another device to transmit and/or receive information via the information transmission and reception region 26 may be arranged inside the vehicle. Here, the term "signal" refers to electromagnetic waves including millimeter-wave, visible light, infrared light, and the like.

The solar direct transmittance of the test region A of the windshield 20 is 60% or less. With such a configuration, the inflow of solar heat into the vehicle cabin can be suppressed, thereby making it unlikely for vehicle occupants to experience any scorching sensation caused by the solar heat.

The infrared reflective layer 25 is a layer having a function of reflecting infrared rays incident upon the windshield 20, and is enclosed in the intermediate film 23 and laminated with glass plates, for example. The infrared reflective layer 25 is, for example, interposed between two intermediate films, thereby forming a configuration in which the infrared reflective layer 25 is enclosed in the intermediate film 23. The infrared reflective layer 25 is located closer to the exterior-side of the vehicle than the shielding layer 24 is to the exterior-side of the vehicle in a cross-sectional view. Further, the infrared reflective layer 25 is peripheral to the information transmission and reception region 26 in a plan view. The infrared reflective layer 25 may be extended to another region from the periphery of the information transmission and reception region 26. The infrared reflective layer 25 may be extended so as to encompass the entirety of test region A, and may be extended so as to encompass the entirety of the windshield 20.

The infrared reflective layer 25 is an infrared reflective film or an infrared reflective coating, for example. Examples of materials of the infrared reflective layer 25 include materials having a layer whose main component is silver as a metal layer, and the like. The infrared reflective film can be fabricated by forming, for example, a layer that has an infrared reflective function, such as silver or the like, onto a film such as polyethylene terephthalate or the like. The infrared reflective coating can be formed by conducting a publicly-known film formation technique on a glass plate.

The infrared reflective layer 25 has a portion that overlaps with the protruding portion 242 in a plan view. In a plan view, it is preferable that an inner-circumferential edge portion $25e_1$ and an outer-circumferential edge portion $25e_2$ of the infrared reflective layer 25 are, for example, respectively set back several mm, for example, 1 mm or more from an inner-circumferential edge portion $241e_1$ and outer-circumferential edge portion $241e_2$ of the protruding portion 242. As a result, the infrared reflective layer 25 can be made not visible from the vehicle-interior side (thereby improving design because the edges of the infrared reflective layer 25 are hidden) and occurrence of optical distortion can be suppressed.

The solar direct reflectance of the region in which the infrared reflective layer 25 is provided on the periphery of the information transmission and reception region 26 is greater than the solar direct reflectance of the test region A by at least 5%. As a result of doing so, the infrared reflective layer 25 reflects infrared rays included in sunlight or the like in the periphery of the information transmission and reception region 26, and thus a temperature rise of the shielding layer 24 caused by infrared rays incident upon and absorbed by the shielding layer 24 arranged closer to the vehicle-interior side than the infrared reflective layer 25 is to the vehicle-interior side can be suppressed. As a result of this, the amount of heat inflow to the vehicle-interior side through the information transmission and reception region 26 decreases, and thus a rise in temperature of the device 300 can be suppressed even though the device 300 is arranged on the vehicle-interior side of the information transmission and reception region 26. Therefore, normal operation of the device 300 can be ensured.

The solar direct reflectance of the region in which the infrared reflective layer 25 is provided on the periphery of the information transmission and reception region 26 more preferably is greater than the solar direct reflectance of the test region A by at least 10% and even more preferably is greater by at least 15%. As a result, the amount of heat inflow to the vehicle-interior side through the information transmission and reception region 26 decreases even more, and a rise in temperature of the device 300 can be further suppressed.

Further, the solar direct reflectance of the region in which the infrared reflective layer 25 is provided on the periphery of the information transmission and reception region 26 preferably is 55% or more, more preferably is 60% or more, and even more preferably is 65% or more. As a result of doing so, the amount of heat inflow to the vehicle-interior side through the information transmission and reception region 26 can be reduced to a sufficient value.

Further, the solar direct reflectance of the region in which the infrared reflective layer 25 is provided on the periphery of the information transmission and reception region 26 preferably is 99% or less and more preferably is 98% or less. Reason being, by having a solar direct reflectance that is 99% or less, the visible light reflectance decreases, and thus vehicle occupants of oncoming vehicles are less likely to be dazzled by light reflected by the infrared reflective layer 25.

Further, the visible light reflectance of the region in which the infrared reflective layer 25 is provided on the periphery of the information transmission and reception region 26 preferably is 98% or less. Reason being, as a result of doing so, the vehicle occupants of the oncoming vehicles are even less likely to be dazzled by visible light reflected away from the vehicle by the infrared reflective layer 25.

Further, the visible light transmittance of the region in which the infrared reflective layer 25 is provided on the periphery of the information transmission and reception region 26 may be less than 70%, excluding where the shielding layer 24 exists. That is, although the test region A, according to regulations, must have a visible light transmittance that is at least 70%, this is not a requirement for the information transmission and reception region 26 so the visible light transmittance may be set to below 70%, and instead, emphasis is placed on infrared ray reflectance capabilities.

Further, the visible light transmittance of the glass plate 22 is preferably 86% or more. By setting the visible light transmittance of the glass plate 22 located closer to the vehicle-exterior side than the infrared reflective layer 25 is to the vehicle-exterior side to 86% or more, the absorption of infrared rays by the glass plate 22 is also suppressed, and thus the effectiveness of the infrared reflective layer increases. Therefore, the infrared rays reflected toward the vehicle-exterior side by the infrared reflective layer 25 is absorbed by the glass plate 22, thereby suppressing a rise in temperature of the glass plate 22.

Preferably, the infrared reflective layer does not exist in the test region A from the standpoint of electromagnetic wave transmittance of the windshield 20. In particular, when infrared reflective layer contains a layer having metal as the main component, this might have an adverse effect on the electromagnetic wave transmittance. In order to ensure sufficient electromagnetic wave transmittance, a portion of the infrared reflective layer extending to inside the test region A may be subjected to decoating processing for example but such kind of treatment is complicated. Even in a case where the infrared reflective layer does not exist in the test region A, sufficient infrared shielding performance in the test region A can be obtained if the green glass is used as glass plate of the windshield 20, for example.

Here, the glass plate 21, the glass plate 22, and the intermediate film 23 are described in detail.

In the front glass 20, the vehicle-interior-side surface 21a of the glass plate 21 (inner surface of the windshield 20) and a vehicle-exterior-side surface 22a of the glass plate 22 (outer surface of the windshield 20) may be flat surfaces or may be curved surfaces.

In organic glass such as soda lime glass, alumino silicate, and the like or organic glass and the like may be used as the glass plates 21 and 22. In a case where the glass plates 21 and 22 are inorganic glass, they can be produced, for example, by the float process. In a case where the glass plates 21 and 22 are soda lime glass, the following: clear glass, green glass, and UV cut green glass containing at least a predetermined amount of an iron component can be suitably employed.

The plate thickness of the thinnest portion of the glass plate 22 located on the exterior of the windshield 20 preferably is 1.8 mm or more and 3 mm or less. When the plate thickness of the glass plate 22 is 1.8 mm or more, the resistance performance to flying stones is sufficiently strong, whereas when the plate thickness of the glass plate 22 is 3 mm or less, the mass of the laminated glass is not excessive and thus is preferable in terms of vehicle fuel economy. The plate thickness of the thinnest portion of the glass plate 22 more preferably is 1.8 mm or more and 2.8 mm or less, and even more preferably is 1.8 mm or more and 2.6 mm or less.

The plate thickness of the glass plate 21 located on the interior side of the windshield 20 is preferably 0.3 mm or more and 2.3 mm or less. The ease in handling is good when the plate thickness of the glass plate 21 is 0.3 mm or more and the mass of the windshield 20 is not excessive when the plate thickness of the glass plate 21 is 2.3 mm or less.

The quality of the glass (residual stress, for example) can be maintained by setting the plate thickness of the glass plate 21 to 0.3 mm or more and 2.3 mm or less. Setting the plate thickness of the glass plate 21 to 0.3 mm or more and 2.3 mm or less is particularly effective in maintaining the glass quality in glass that is deeply curved. The plate thickness of the glass plate 21 more preferably is 0.5 mm or more and 2.1 mm or less, and even more preferably is 0.7 mm or more and 1.9 mm or less.

However, the plate thickness of the glass plates 21 and 22 are not constant, and thus the thickness may vary from place to place as necessary. For example, one or both of the glass plates 21 and 22 may be provided with a region having a wedge-shaped cross section in which the thickness of the upper edge in the vertical direction is greater than that of the bottom edge when the windshield 20 is attached to the vehicle.

In a case where the windshield 20 is curved, the glass plates 21 and 22 are bent and molded, such as by the float process, prior to adhesion by the intermediate film 23. Bending is accomplished by softening the glass by heating. The temperature at which the glass is heated during bending and molding is approximately 550° C. to 700° C., Thermoplastic resins are frequently used as the intermediate film 23 for bonding the glass plate 21 and the glass plate 22 together. For example, thermoplastic resins that have been conventionally used for such applications as plasticized polyvinyl acetal-based resins, plasticized polyvinyl chloride-based resins, saturated polyester-based resins, plasticized saturated polyester-based resins, polyurethane-based resins, plasticized polyurethane-based resins, ethylene-vinyl acetate copolymer-based resins, ethylene-ethyl acrylate copolymer-based resins, and the like. Resin compositions containing modified block copolymer hydrides as described in Japanese Patent No. 6065221 can also be suitably employed.

Among these, plasticized polyvinyl acetal-based resin is preferably used because it has excellent, balance of various performance characteristics such as transparency, weather resistance, strength, adhesiveness, penetration resistance, shock absorption, moisture resistance, thermal insulation, sound insulation and the like. These thermoplastics may be used alone or in combination with two or more types. "Plasticization" in the above-described plasticized polyvinyl acetal resin refers to plasticizing by the addition of a plasticizer. The same applies to other plasticized resins.

The above-described polyvinyl acetal-based resin includes a polyvinyl formal resin obtained by reacting a polyvinyl alcohol (hereinafter, sometimes referred to as "PVA" as necessary) with formaldehyde, a narrowly defined polyvinyl acetal resin obtained by reacting a PVA with acetaldehyde, and a polyvinyl butyral resin obtained by reacting a PVA with n-butyraldehyde (hereinafter, sometimes referred to as "PVB" as necessary). In particular, the PVB is considered to be suitable because it has excellent balance of various performance characteristics such as transparency, weather resistance, strength, adhesiveness, penetration resistance, shock absorption, moisture resistance, thermal insulation, sound insulation, and the like. These polyvinyl acetal-based resins may be used alone or two or more types of these polyvinyl acetal-based resins may be used together. However, the material forming the intermediate film 23 is not limited to the thermoplastic resin. Preferably, the film thickness of the thinnest portion of the intermediate film 23 is 0.5 mm. When the film thickness of the intermediate film 23 is 0.5 mm or more, the penetration resistance necessary as a windshield is sufficient. Further, it is preferable that the film thickness of the thickest portion of the intermediate film 23 is 3 mm or less. When the maximum value of the film thickness of the intermediate film 23 is 3 mm or less, the mass of the laminated glass is not excessive. The maximum value of the intermediate film 23 more preferably is 2.8 mm or less and even more preferably is 2.6 mm or less. The intermediate film 23 may have a wedge-shaped cross section to ensure suitability for a heads-up display.

The intermediate film 23 may have three or more layers. For example, the intermediate film is constituted by three layers, and the hardness of the middle layer is lowered below the hardness of the other two layers by adjusting the plasticizer or the like, thereby improving the sound insulation of the laminated glass. In this case, the hardness of the other two layers may be the same or may be different.

In order to fabricate the intermediate film 23, for example, one of the above-described materials that form the intermediate film is appropriately selected. Then, the extrusion conditions such as extrusion speed of an extruder is set to be uniform. Thereafter, the intermediate film 23 is completed by extending the extruded resin film, for example, as necessary, in order to provide curvature to the top side and the bottom side in accordance with the design of the windshield 20.

In order to fabricate the laminated glass, a laminate is formed by sandwiching the infrared reflective layer 25 and the intermediate film 23 between the glass plate 21 and the glass plate 22. Then, for example, this laminate is placed into a rubber sack, and bonded at a temperature of approximately 70 to 110° C. in a vacuum of −100 to −65 kPa.

Moreover, the durability of the laminated glass can be further improved by performing compressing bonding processing under a heating and pressuring condition of, for example, a temperature of 100 to 150° C. and a pressure of 0.6 to 1.3 MPa. However, in some cases, taking into account the simplification of processes and the characteristics of the materials enclosed in the laminated glass, the heating and pressurizing process may not need to be used.

In addition to the intermediate film 23 and the infrared reflective layer 25, a film or device having functions such as light emission, dimming, visible light reflection, scattering, decoration, absorption, and the like may be provided between the glass plate 21 and the glass plate 22 to the extent that effects of the present disclosure are not impaired.

In this way, in the windshield 20, the solar direct reflectance of the region in which the infrared reflective layer 25 is provided on the periphery of the information transmission and reception region 26 is greater than the solar direct reflectance of the test region A by at least 5%. As a result, the amount of heat inflow into the vehicle-interior side through the information transmission and reception region 26 decreases, and thus a rise in temperature of the device 300 can be suppressed even though the device 300 is arranged on the vehicle-interior side of the information transmission and reception region 26. Therefore, normal operation of the device 300 can be ensured. That is, the windshield 20 that makes it unlikely for the sensing performance of the device 300 to be hindered by heat caused by infrared rays radiated into the vehicle can be provided.

First Variation of First Embodiment

In the First Variation of the First Embodiment, the locations of the infrared reflective layer and/or the shielding layer are different from those in the First Embodiment. In the First Variation of the First Embodiment, the description of the same configuration components already described in a previous embodiment may be omitted.

Figure 3:
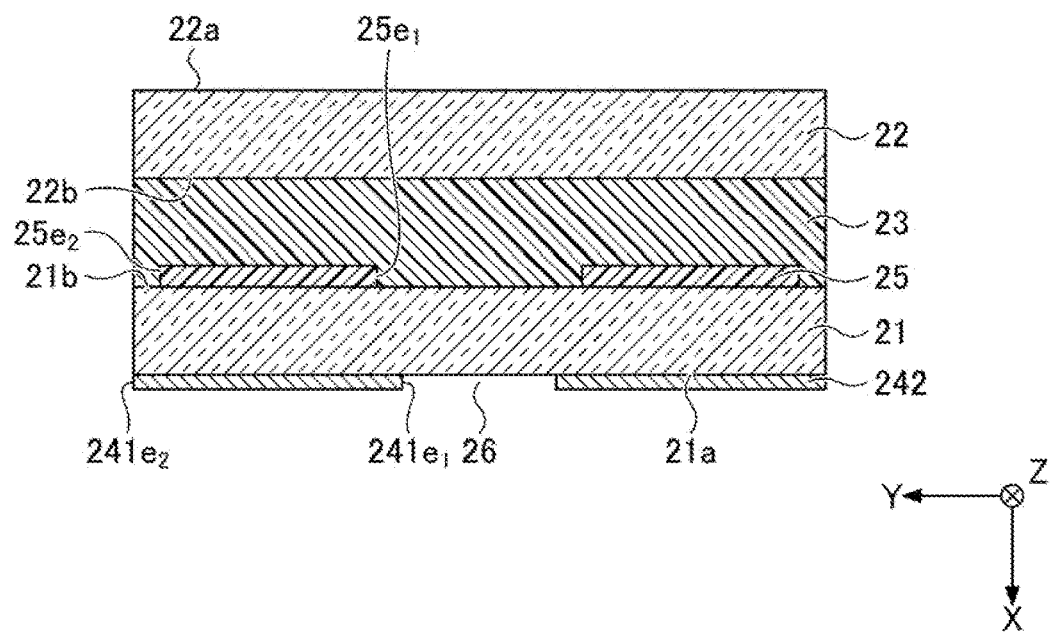
FIG. 3 is a partially enlarged cross-sectional view illustrating the vicinity of an information transmission and reception region according to a first variation of the First Embodiment (first of three)
Figure 4:
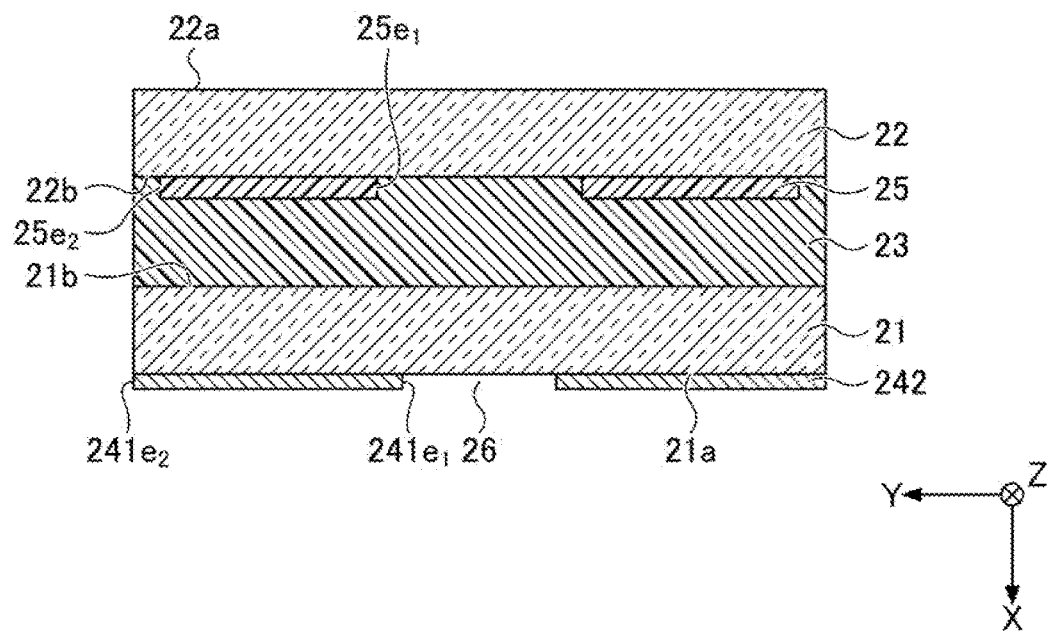
FIG. 4 is a partially enlarged cross-sectional view illustrating the vicinity of the information transmission and reception region according to the first variation of the First Embodiment (second of three)
Figure 5:
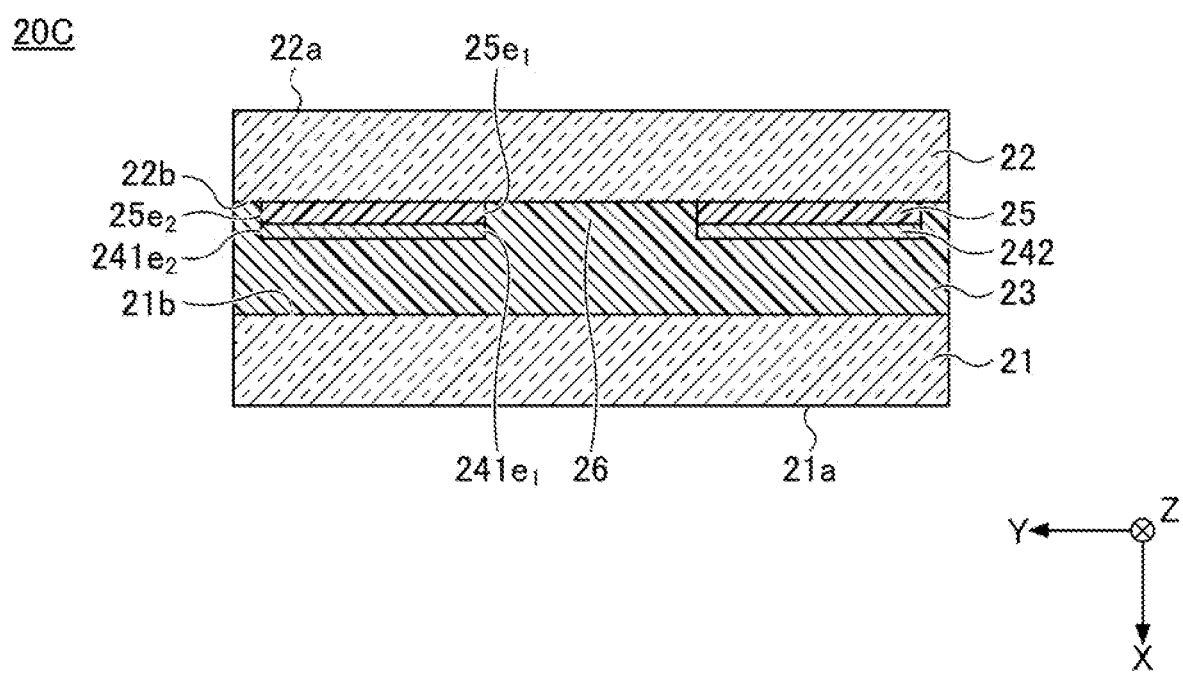
FIG. 5 is a partially enlarged cross-sectional view illustrating the vicinity of the information transmission and reception region according to the first variation of the First Embodiment (third of three)

FIG. 3 is a partially enlarged cross-sectional view illustrating the vicinity of an information transmission and reception region according to the First Variation of the First Embodiment (first of three), and is a cross-section corresponding to FIG. 2B. FIG. 4 is a partially enlarged cross-sectional view illustrating the vicinity of the information transmission and reception region according to the First Variation of the First Embodiment (second of three), and is a cross-section corresponding to FIG. 2B. FIG. 5 is a partially enlarged cross-sectional view illustrating the vicinity of the information transmission and reception region according to the First Variation of the First Embodiment (third of three), and is a cross-section corresponding to FIG. 2B. In the First Variation of the First Embodiment, since the partially enlarged cross-sectional view schematically illustrating an aspect of the information transmission and reception region as observed from the interior of the vehicle toward the exterior of the vehicle is substantially the same as FIG. 2A, no illustration is provided.

The infrared reflective layer 25 may be provided on a vehicle-exterior-side surface 21b of the glass plate 21 as in a windshield 20A illustrated in FIG. 3. Alternatively, the infrared reflective layer 25 may be provided on a vehicle-interior-side surface 22b of the glass plate 22 as in a windshield 20B illustrated in FIG. 4. Alternatively, the infrared reflective layer 25 may be provided on the vehicle-interior-side surface 22b of the glass plate 22, and the protruding portion 242 of the shielding layer 24 may be provided on the vehicle-interior-side surface of the infrared reflective layer 25, as in a windshield 20C illustrated in FIG. 5.

In the cases of FIG. 3 to FIG. 5, the infrared reflective layer 25 is, for example, an infrared reflective coating applied to the glass plate. The infrared reflective coating is formed by sputtering, for example. An infrared reflective film may be used as the infrared reflective layer 25 and may be bonded to, for example, the vehicle-exterior-side surface 21b of the glass plate 21 by an adhesive. In FIG. 5, the shielding layer 24 may be provided on the vehicle-interior-side surface 21a of the glass plate 21 in addition to the vehicle-interior-side surface of the infrared reflective layer 25. The aspects as illustrated in FIG. 3 to FIG. 5 as well exhibit substantially the same effects as those in the First Embodiment.

Second Variation of First Embodiment

In the Second Variation of the First Embodiment, an example is illustrated in which the shielding layer is also provided closer to the vehicle-exterior side than the infrared reflective layer is to the vehicle-exterior side. In the Second Variation of the First Embodiment, the description of the same configuration components already described in a previous embodiment may be omitted.

Figure 6A:
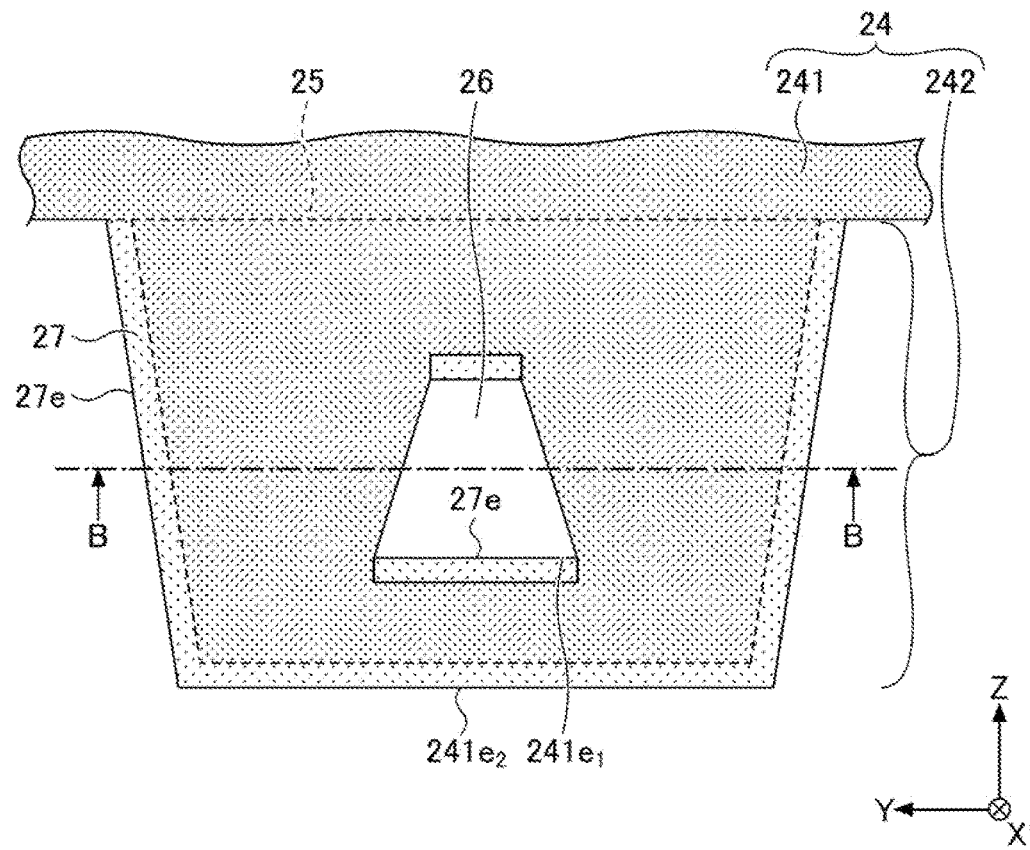
FIGS. 6A and 6B are diagrams illustrating the vicinity of an information transmission and reception region according to a second variation of the First Embodiment.

FIG. 6A and FIG. GB are diagrams illustrating an example of the vicinity of an information transmission and reception region according to the Second Variation of the First Embodiment. FIG. 6A is a partially enlarged plan view schematically illustrating an aspect of the vicinity of the information transmission and reception region as observed from the interior of the vehicle toward the exterior of the vehicle, whereas FIG. 6B is a partially enlarged cross-sectional view taken along B-B line of FIG. 6A.

Figure 6B:
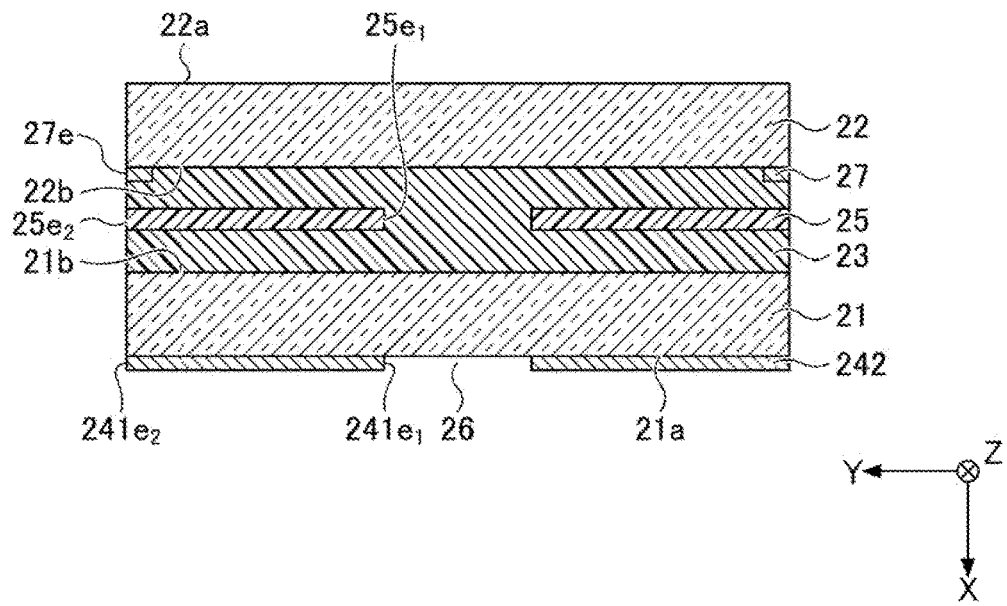

As illustrated in FIG. 6A and FIG. 6B, a windshield 20D is different from the windshield 20 (refer to FIGS. 2A and 2B and so on) in that a shielding layer 27 is provided on the vehicle-interior-side surface 22b of the glass plate 22 in addition to the shielding layer 24 (including the protruding portion 242) provided on the vehicle-interior-side surface 21a of the glass plate 21. The infrared reflective layer 25 is arranged between the shielding layer 24 and the shielding layer 27, in a cross-sectional view. The infrared reflective layer 25 may be provided on the vehicle-exterior-side surface 21b of the glass plate 21.

In a plan view, the shielding layer 27 is arranged along at least a portion of the inner-circumferential edge portion $241e_1$ and the outer-circumferential edge portion $241e_2$ of the protruding portion 242. However, the shielding layer 27 may be provided along the entirety of the inner-circumferential edge portion $241e_1$ and the outer-circumferential edge portion $241e_2$ of the protruding portion 242. That is, in FIG. 6A, the shielding layer 27 may be provided along the two diagonal sides of the trapezoid opening portion that demarcates the information transmission and reception region 26. Here, the term "along" means that the distance between the edges (edges portions) of the protruding portion 242 and the shielding layer 27 is within 10 mm in a plan view.

In this manner, the shielding layer 27 may be arranged along a portion of at least the inner-circumferential edge portion $241e_1$ or the outer-circumferential edge portion $241e_2$ of the protruding portion 242 in a plan view. By doing so, the location of an edge portion 27e (edge portion facing the side where the protruding portion 242 does not exist) of the shielding layer 27 coincides with the location of the inner-circumferential edge portion $241e_1$ and the outer-circumferential edge portion $241e_2$ of the protruding portion 242, and thus optical distortion can be decreased.

Also, it is preferable that the surface area of the infrared reflective layer 25 not overlapping with the shielding layer 27 in a plan view is 20% or more of the surface area of the protruding portion 242, in order to suppress the amount of inflow of solar heat to the device 300 arranged in the vehicle cabin.

Third Variation of First Embodiment

The Third Variation of the First Embodiment illustrates an example that is not laminated glass. In the Third Variation of the First Embodiment, the description of the same configuration components already described in a previous embodiment may be omitted.

Figure 7:
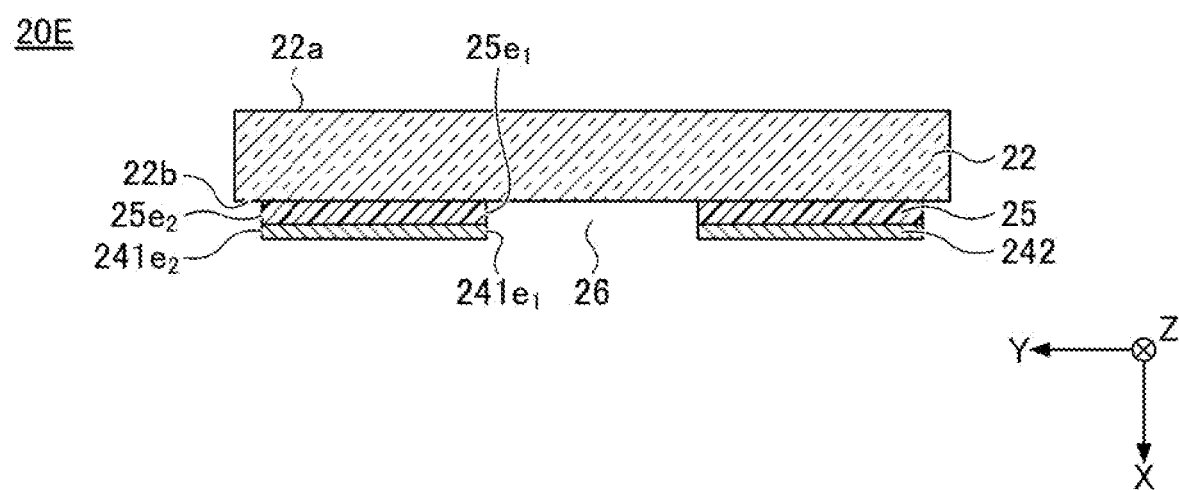
FIG. 7 is a partially enlarged cross-sectional view illustrating the vicinity of an information transmission and reception region according to a third variation of the First Embodiment.

FIG. 7 is a partially enlarged cross-sectional view illustrating the vicinity of an information transmission and reception region according to a third variation of the First Embodiment and is a cross-section corresponding to FIG. 2B. In the third variation of the First Embodiment, since the partially enlarged cross-sectional view schematically illustrating an aspect of the information transmission and reception region as observed from the interior toward the exterior of the vehicle is substantially the same as FIG. 2A, no illustration is provided.

As illustrated in FIG. 7, a windshield 20E is glass for a vehicle (is not laminated glass), and includes the glass plate 22, the shielding layer 24 (including the protruding portion 242), the infrared reflective layer 25, and the information transmission and reception region 26. The infrared reflective layer 25 is provided on the vehicle-interior-side surface 22b of the glass plate 22 whereas the protruding portion 242 is provided on a vehicle-interior-side surface of the infrared reflective layer 25.

As such, even in the case where the windshield 20E is not laminated glass, by providing the infrared reflective layer 25 closer to the exterior-side of the vehicle than the protruding portion 242 of the shielding layer 24 is to the exterior-side of the vehicle, the effects exhibited are substantially the same as those in the First Embodiment Examples 1 to 3 and Comparative Examples 1 to 3

In Examples 1 to 3 and in Comparative Examples 1 to 3, simulations were performed with the conditions as: solar heat 1000 W/m², a vehicle internal temperature of 35° C., and a vehicle external temperature of 35° C., with the assumption that the vehicle was started after leaving the vehicle exposed to the hot summer sun.

Specifically, simulations were performed to obtain the vehicle-interior surface heat-inflow amount of the information transmission and reception region 26 after having changed the solar direct reflectance, the solar direct transmittance, the solar direct absorptance, and the vehicle-interior surface normal emissivity of the periphery (region in which there is overlap with the protruding portion 242 in a plan view) of the information transmission and reception region 26. Then, then thermal evaluations of information transmission and reception devices were performed based on the vehicle-interior surface heat-inflow amounts. Also, evaluations were performed with respect to the scorching sensation felt by the vehicle occupants (the extent to which heat is felt by the vehicle occupants) and with respect to the electromagnetic wave transmittance after having changed the visible light transmittance of the test region A and the solar direct reflectance of the test region A.

Examples 1A and 1B

In Example 1A, clear glass (product name FL: manufactured by AGC Inc.) that is 300 mm in length and 300 mm in width and has a plate thickness of 2 mm was used as the glass plates 21 and 22 and polyvinyl butyral having a thickness of 0.76 mm was used as the intermediate film 23 to fabricate laminated glass equipped with a shielding layer 24 (including the protruding portion 242) made of black ceramics provided on the peripheral portion of the vehicle-interior-side surface 21a of the glass plate 21. Also, an infrared reflective layer 25 having a silver metal layer was provided in a region overlapping with the protruding portion 242, in a plan view, on the vehicle-interior-side surface 22b of the glass plate 22. Also, an infrared reflective layer (Referred to as an infrared reflective layer 35 for convenience. The infrared reflective layer 35 has a silver metal layer) with optical characteristics different from the infrared reflective layer 25 was provided in the region overlapping with the test region A, in a plan view, on the vehicle-interior-side surface 22b of the glass plate 22. Then, the optical characteristics of the infrared reflective layers 25 and 35 were adjusted such that the solar direct reflectance of the region in which the infrared reflective layer 25 was provided is greater than the solar direct reflectance of the region in which the infrared reflective layer 35 was provided.

In Example 1B, the shielding layer 24 was provided on the vehicle-interior-side surface 22b of the glass plate 22 via the infrared reflective layer 25 (the shielding layer 24 was provided on the vehicle-interior-side surface of the infrared reflective layer 25) without providing the shielding layer 24 on the vehicle-interior-side surface 21a of the glass plate 21. With exception to these two points, the laminated glass was fabricated in substantially the same manner as in Example 1A.

Examples 2A and 2B

In Example 2A, with exception to the fact that the characteristics of the infrared reflective layer 25 were changed, the laminated glass was fabricated with substantially the same configuration as in Example 1A.

In Example 2B, with exception to the fact that the characteristics of the infrared reflective layer 25 were changed, the laminated glass was fabricated with substantially the same configuration as in Example 1B.

Examples 3A and 3B

In Example 3A, with exception to the fact that the characteristics of the infrared reflective layer 25 were changed, the laminated glass was fabricated with substantially the same configuration as in Example 1A.

In Example 3B, with exception to the fact that the characteristics of the infrared reflective layer 25 were changed, the laminated glass was fabricated with substantially the same configuration as in Example 1B.

Comparative Examples 1A and 1B

In Comparative Example 1A, with exception to the fact that an infrared reflective layer (referred to as infrared reflective layer 45 for convenience), having the same optical characteristics as the infrared reflective layer 25, was provided in a region overlapping with the test region A, in a plan view, on the vehicle-interior-side surface 22b of the glass plate 22, the laminated glass with substantially the same configuration as that in Example 1A was fabricated. That is, in Comparative Example 1A, the solar direct reflectance of the region in which the infrared reflective layer 25 was provided is the same as the solar direct reflectance of the region in which the infrared reflective layer 45 was provided.

In Comparative Example 1B, the shielding layer 24 was provided on the vehicle-interior-side surface 22b of the glass plate 22 via the infrared reflective layer 25 (the shielding layer 24 was provided on the vehicle-interior-side surface of the infrared reflective layer 25), without providing the shielding layer 24 on the vehicle-interior-side surface 21a of the glass plate 21. With exception to these two points, the laminated glass was fabricated in substantially the same manner as that in Comparative Example 1A.

Comparative Examples 2A and 2B

In Comparative Example 2A, with exception to the fact that the characteristics of the infrared reflective layers 25 and 45 were changed, the laminated glass was fabricated with substantially the same configuration as that in Comparative Example 1A.

In Comparative Example 2B, with exception to the fact that the characteristics of the infrared reflective layers 25 and 45 were changed, the laminated glass was fabricated with substantially the same configuration as that in Comparative Example 1B.

Comparative Examples 3A and 3B

In Comparative Example 3A, with exception to the fact that the characteristics of the infrared reflective layers 25 and 45 were changed, the laminated glass was fabricated with substantially the same configuration as that in Comparative Example 1A.

In Comparative Example 3B, with exception to the fact that the characteristics of the infrared reflective layers 25 and 45 were changed, the laminated glass was fabricated with substantially the same configuration as that in Comparative Example 1B.

Evaluation Results

FIGS. 8 and 9 illustrate the simulation results. For the thermal evaluation of the information transmission and reception devices with respect to the vehicle-interior surface heat-inflow amount, a rating of "good" was given in a case in which the amount was less than 120 W/m$^2$, a rating of "fair" was given in a case in which the amount was greater than or equal to 120 W/m$^2$ and less than 260 W/m$^2$, and a rating of "bad" was given in a case where the amount was 260 W/m$^2$ or more. The rating of "bad" means that the rise in temperature of the information transmission and reception device is high, reaching 70° C., and this is the level at which operation of the device is adversely affected.

Also, in regard to the evaluations of the test region A with respect to the visible light transmittance of the test region A, a rating of "good" was given in a case where the percentage was 70% or more (meets regulations), whereas a rating of "bad" was given in a case where the percentage was below 70% (does not meet regulations). In regard to the evaluations of the scorching sensation felt by vehicle occupants, a rating of "very good" was given in a case where the Te of the test region A was below 50%, and a rating of "good" was given in a case where the Te was greater than or equal to 50% and less than 60%. In regard to the evaluations of the electromagnetic wave transmittance, a rating of "good" was given in a case in which there is no infrared reflective layer having a metal layer that inhibits transmittance of electromagnetic waves through the test region A, whereas a rating of "fair" was given in a case where there is an infrared reflective layer having a metal layer that inhibits transmittance of electromagnetic waves through the test region A.

As illustrated in FIG. 8, in Examples 1A, 1B, 2A, 2B, 3A, and 3B, the thermal evaluations of all the information transmission and reception devices were "good", and this can be regarded as the state in which the information transmission and reception devices can operate without any problems.

Also, the evaluations of the visible light transmittance were "good" and the evaluations of the scorching sensation felt by vehicle occupants were "very good". That is, all of these results were favorable. However, since there is an infrared reflective layer having a metal layer that inhibits transmittance of electromagnetic waves through the test region A, the evaluation of the electromagnetic wave transmittance was "fair".

As illustrated in FIG. 9, in Comparative Examples 1A and 1B, since the solar direct reflectance in the periphery of the information transmission and reception region is the same as that in Examples 1A and 1B, the thermal evaluation of the information transmission and reception devices was "good" and this can is regarded as the state in which the information transmission and reception devices can operate without any problem. However, since solar direct reflectance of the test region A is made the same as the solar direct reflectance of the periphery of the information transmission and reception region, the visible light transmittance decreased to below 70%.

The visible light transmittance can be increased to 70% or more, as in Comparative Examples 2A and 2B and 3A and 3B, by further decreasing the solar direct reflectance of the periphery of the information transmission and reception region and the solar direct reflectance of the test region A in Comparative Examples 1A and 1B. However, in such a case, decreasing the solar direct reflectance of the periphery of the information transmission and reception region in Comparative Examples 1A and 1B caused the vehicle-interior surface heat-inflow amount to increase to 120 W/m$^2$ or more, and as a result, the thermal evaluation of the information transmission and reception devices dropped from a rating of "good" to a rating of "fair".

Using the above results, comprehensive evaluations were performed. A comprehensive evaluation of "good" was given if, among the items of thermal evaluation, visible light transmittance, scorching sensation felt by vehicle occupants, and electromagnetic wave transmittance, one or less items had an evaluation of "fair". A comprehensive evaluation of "fair" was given if two of the items had an evaluation of "fair" or less, and a comprehensive evaluation of "bad" was given if one or more items had an evaluation of "bad".

As the comprehensive evaluations of Examples 1 to 3 and Comparative Examples 1 to 3, Examples 1 to 3 are "good", Comparative Example 1 is "bad", Comparative Examples 2 and 3 are "fair", and thus Examples 1 to 3 are comprehensively superior to Comparative Examples 1 to 3.

In the respective examples and comparative examples, it is evident that the in-vehicle surface heat-inflow amount can be suppressed more effectively when the shielding layer 24 is provided on the vehicle-interior-side surface 22b of the glass plate 22 via the infrared reflective layer 25 in comparison to when the shielding layer 24 is provided on the peripheral portion of the vehicle-interior-side surface 21a of the glass plate 21.

Based on the results in FIG. 8 and FIG. 9, it is evident that the solar direct reflectance of the periphery of the information transmission and reception region needs to be made greater than the solar direct reflectance of the test region A in order to attain a thermal evaluation of "good" for the information transmission and reception device and to attain a visible light transmittance evaluation of "good".

The difference between the solar direct reflectance of the periphery of the information transmission and reception region and the solar direct reflectance of the test region A is 10.3% in Examples 1A and 1B, is 16.8% in Examples 2A and 2B, and is 24.3% in Examples 3A and 3B, and the greater the difference is between the two, the lower the vehicle-interior surface heat-inflow amount is. Based on this, the greater the solar direct reflectance with respect to the solar direct reflectance of the test region A, the more preferable the state is with respect to operation of the device.

Example 4, Example 5, and Comparative Example 4

In Example 4, Example 5, and Comparative Example 4, simulations were performed in substantially the same manner as Examples 1 to 3 and Comparative Examples 1 to 3, with the conditions as: solar heat 1000 W/m², a vehicle internal temperature of 35° C., and a vehicle external temperature of 35° C., with the assumption that the vehicle was started after leaving the vehicle exposed to the hot summer sun.

Specifically, simulations were performed to obtain the vehicle-interior surface heat-inflow amount of the information transmission and reception region 26 after having changed the solar direct reflectance, the solar direct transmittance, the solar direct absorptance, the vehicle-interior surface normal emissivity of the periphery (region in which there is overlap with the protruding portion 242 in a plan view) of the information transmission and reception region 26. Then the thermal evaluations of information transmission and reception devices were performed based on the vehicle-interior surface heat-inflow amounts. Also, evaluations were performed with respect to the scorching sensation felt by the vehicle occupants and with respect to the electromagnetic wave transmittance after having changed the visible light transmittance of the test region A and the solar direct reflectance of the test region A.

Comparative Examples 4A and 4B

In Comparative Example 4A, green glass (product name VFL: manufactured by AGC Inc.) that is 300 mm in length and 300 mm in width and has a plate thickness of 2 mm was used as the glass plates 21 and 22 and polyvinyl butyral having a thickness of 0.76 mm was used as the intermediate film 23 to fabricate laminated glass having a shielding layer 24 (including the protruding portion 242) made of black ceramics provided on the peripheral portion of the vehicle-interior-side surface 21a of the glass plate 21. Also, an infrared reflective layer 25 substantially the same as that in Comparative Example 3A was provided in a region overlapping with the protruding portion 242, in a plan view, on the vehicle-interior-side surface 22b of the glass plate 22. However, an infrared reflective layer was not provided in a region overlapping with test region A, in a plan view, of the vehicle-interior-side surface 22b of the glass plate 22.

In Example 4B, the shielding layer 24 substantially the same as that in Comparative example 3A was provided on the vehicle-interior-side surface 22b of the glass plate 22 via the infrared reflective layer 25 (the shielding layer 24 was provided on the vehicle-interior-side surface of the infrared reflective layer 25), without providing the shielding layer 24 on the vehicle-interior-side surface 21a of the glass plate 21. With exception to these two points, the laminated glass was fabricated in substantially the same manner as that in Example 4A.

Examples 5A and 5B

In Example 5A, with exception to the fact that the characteristics of the infrared reflective layer 25 were changed, the laminated glass was fabricated with substantially the same configuration as that in Example 4A.

In Example 5B, with exception to the fact that the characteristics of the infrared reflective layer 25 were changed, the laminated glass was fabricated in substantially the same configuration as that in Example 4B.

Comparative Examples 4A and 4B

In Comparative Example 4A, with exception to the fact that the infrared reflective layer was not provided, in the region overlapping with the protruding portion 242, of the vehicle-interior-side surface 22b of the glass plate 22, the laminated glass was fabricated with substantially the same configuration as in Example 4A. That is, in Comparative Example 4A, the infrared refection layer was not provided on the periphery of the information transmission and reception region or in the test region A.

In Comparative Example 4B, the shielding layer 24 was provided on the vehicle-interior-side surface 22b of the glass plate 22 via the infrared reflective layer 25 (the shielding layer 24 was provided on the vehicle-interior-side surface of the infrared reflective layer 25), without providing the shielding layer 24 on the vehicle-interior-side surface 21a of the glass plate 21. With exception to these two points, the laminated glass was fabricated in substantially the same manner as that in Comparative Example 4A.

Evaluation Results

FIG. 10 illustrates the simulation results. As illustrated in FIG. 10, in regard to the thermal evaluations of the information transmission and reception devices in Examples 4A and 4B and Examples 5A and 5B, a rating of "fair" was given, whereas in the regard to the thermal evaluations of the information transmission and reception devices in Comparative Examples 4A and 4B, a rating of "bad" was given. Besides this, there were no other significant differences.

As indicated, in a case where the infrared reflective layer is not provided in the test region A, all the results were favorable for the evaluation of the visible light transmittance of the test region A, the evaluation of the electromagnetic wave transmittance, and the evaluation of scorching sensation felt by vehicle occupants. However, as in Comparative Examples 4A and 4B, in a case where the infrared reflective layer is not provided on the periphery of the information transmission and reception region, the vehicle-interior surface heat-inflow amount increases, and thus a rating of "bad" was given for the thermal evaluation of the information transmission and reception devices. That is, the temperature rise of the information transmission and reception region is high, reaching a level at which operation of the device is adversely affected.

In contrast to this, in Examples 4A and 4B and Examples 5A and 5B in which an infrared reflective layer is provided on the periphery of the information transmission and reception region, the solar direct reflectance of the periphery of the information transmission and reception region is greater than the solar direct reflectance of the test region A by at least 5%, a rating of "fair" was given as the thermal evaluation of the information transmission and reception devices. This is within the allowable range for operation of the devices.

As the comprehensive evaluations of Examples 4 and 5 as well as Comparative Example 4, Examples 4 and 5 are "good", Comparative Example 4 is "bad", and thus Examples 4 and 5 are comprehensively superior to Comparative Example 4.

Although the preferred embodiments have been described in detail above, various alterations and substitutions may be made to the above-described embodiments without departing from the scope of the claims.

What is claimed is:
1. Glass for a vehicle, the glass comprising:
a glass plate;
a test region A demarcated in the glass plate, the test region A being specified in Japanese Industrial Standard JIS R3212;

a shielding layer provided more outwardly than the test region A in a plan view;

an information transmission and reception region demarcated within an opening portion provided in the shielding layer, and through which a device mounted in the vehicle transmits and/or receives information; and an infrared reflective layer positioned peripheral to the information transmission and reception region in a plan view, the infrared reflective layer having a portion that overlaps with the shielding layer in a plan view, wherein a solar direct transmittance of the test region A is 60% or less and a solar direct reflectance of a region in which the infrared reflective layer is provided peripheral to the information transmission and reception region is greater than a solar direct reflectance of the test region A by at least 5%.

2. The glass according claim 1, wherein the infrared reflective layer is an infrared reflective coating or an infrared reflective film.

3. The glass according to claim 1, wherein the solar direct reflectance of the region in which the infrared reflective layer is provided is 55% or more.

4. The glass according to claim 1, wherein a visible light reflectance of the region in which the infrared reflective layer is provided is 98% or less.

5. The glass according to claim 1, wherein the solar direct reflectance of the region in which the infrared reflective layer is provided is 99% or less.

6. The glass according to claim 1, wherein a visible light transmittance of the region in which the infrared reflective layer is provided, is less than 70%, excluding where the shielding layer exists.

7. The glass according to claim 1, wherein the solar direct reflectance of the region in which the infrared reflective layer is provided peripheral to the information transmission and reception region is greater than the solar direct reflectance of the test region A by at least 15%.

8. The glass according to claim 1, wherein an edge portion of the infrared reflective layer is set back from an edge portion of the shielding layer in a plan view.

9. Laminated glass for a vehicle, the laminated glass comprising:

a first glass plate serving as a vehicle-interior-side glass plate situated on a vehicle-interior side upon attaching of the laminated glass to the vehicle;

a second glass plate serving as a vehicle-exterior-side glass plate situated on a vehicle-exterior side upon attaching of the laminated glass to the vehicle;

an intermediate film situated between, and configured to bond together, the first glass plate and the second glass plate;

a test region A demarcated in the first glass plate, the intermediate film, and the second glass plate, the test region A being specified in Japanese Industrial Standard JIS R3212;

a shielding layer provided on a vehicle-interior-side surface of the first glass plate and situated more outwardly than the test region A in a plan view;

an information transmission and reception region demarcated within an opening portion provided in the shielding layer, and through which a device mounted in the vehicle transmits and/or receives information; and an infrared reflective layer positioned peripheral to the information transmission and reception region in a plan view, the infrared reflective layer having a portion that overlaps with the shielding layer, wherein the infrared reflective layer is provided closer to the vehicle-exterior side than the shielding layer is to the vehicle-exterior side, and wherein a solar direct transmittance of the test region A is 60% or less and a solar direct reflectance of a region in which the infrared reflective layer is provided peripheral to the information transmission and reception region is greater than a solar direct reflectance of the test region A by at least 5%.

10. The laminated glass according to claim 9, wherein a visible light transmittance of the second glass plate is 86% or more.

11. Laminated glass for a vehicle, the laminated glass comprising:

a first glass plate serving as a vehicle-interior-side glass plate situated on a vehicle-interior side upon attaching of the laminated glass to the vehicle;

a second glass plate serving as a vehicle-exterior-side glass plate situated on a vehicle-exterior side upon attaching of the laminated glass to the vehicle;

an intermediate film situated between, and configured to bond together, the first glass plate and the second glass plate;

a test region A demarcated in the first glass plate, the intermediate film, and the second glass plate, the test region A being specified in Japanese Industrial Standard JIS R3212;

an infrared reflective layer provided on a vehicle-interior-side surface of the second glass plate;

a shielding layer provided on a vehicle-interior-side surface of the infrared reflective layer; and an information transmission and reception region demarcated within an opening portion provided in the shielding layer, and through which a device mounted in the vehicle transmits and/or receives information, wherein the infrared reflective layer is positioned peripheral to the information transmission and reception region in a plan view, the infrared reflective layer having a portion that overlaps with the shielding layer in a plan view, and wherein a solar direct transmittance of the test region A is 60% or less and a solar direct reflectance of a region in which the infrared reflective layer is provided peripheral to the information transmission and reception region is greater than a solar direct reflectance of the test region A by at least 5%.

12. The laminated glass according to claim 11, wherein a visible light transmittance of the second glass plate is 86% or more.

13. Laminated glass for a vehicle, the laminated glass comprising:

a first glass plate serving as a vehicle-interior-side glass plate situated on a vehicle-interior side upon attaching of the laminated glass to the vehicle;

a second glass plate serving as a vehicle-exterior-side glass plate situated on a vehicle-exterior side upon attaching of the laminated glass to the vehicle;

an intermediate film situated between, and configured to bond together, the first glass plate and the second glass plate;

a test region A demarcated in the first glass plate, the intermediate film, and the second glass plate, the test region A being specified in Japanese Industrial Standard JIS R3212;

a first shielding layer provided on a vehicle-interior-side surface of the first glass plate and situated more outwardly than the test region A in a plan view;

a second shielding layer provided on a vehicle-interior-side surface of the second glass plate and situated more outwardly than the test region A in a plan view;

an information transmission and reception region demarcated within an opening portion provided in the first shielding layer, and through which a device mounted in the vehicle transmits and/or receives information; and an infrared reflective layer positioned peripheral to the information transmission and reception region in a plan view, the infrared reflective layer having a portion that overlaps with the first shielding layer or the second shielding layer in a plan view, wherein the first shielding layer includes a peripheral region provided on a peripheral portion of the vehicle-interior-side surface of the first glass plate, and includes a protruding portion that protrudes from the peripheral region toward the test region A in a plan view, wherein the infrared reflective layer is arranged between the first shielding layer and the second shielding layer, and a surface area of the infrared reflective layer not overlapping with the second shielding layer in a plan view is 20% or more of a surface area of the protruding portion, wherein the opening portion is provided in the protruding portion, and wherein a solar direct transmittance of the test region A is 60% or less and a solar direct reflectance of a region in which the infrared reflective layer is provided peripheral to the information transmission and reception region is greater than a solar direct reflectance of the test region A by at least 5%.

14. The laminated glass according to claim 13, wherein, in a plan view, the second shielding layer is arranged along at least a portion of a peripheral portion of the protruding portion.

15. The laminated glass according to claim 13, wherein a visible light transmittance of the second glass plate is 86% or more.

* * * * *